Oct. 23, 1923.
J. S. GREENE
1,471,728
FILM ROLL BOX
Original Filed Dec. 26, 1919    2 Sheets-Sheet 1
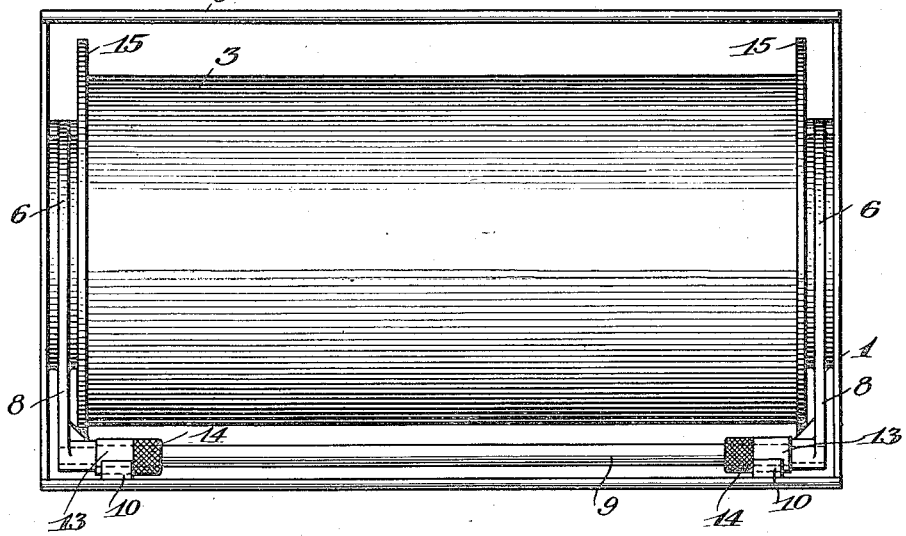
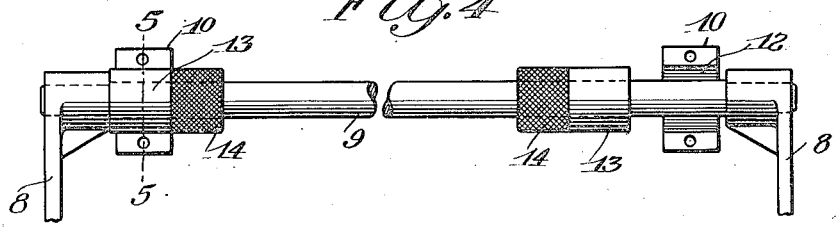
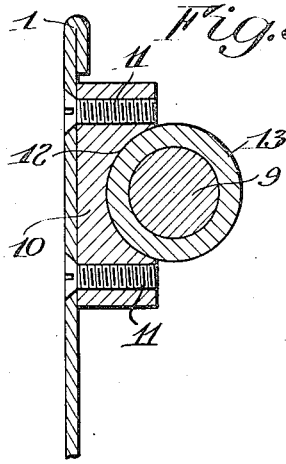
INVENTOR.
John S. Greene
BY
his ATTORNEY Oct. 23, 1923.
J. S. GREENE
FILM ROLL BOX
Original Filed Dec. 26, 1919    2 Sheets-Sheet 2
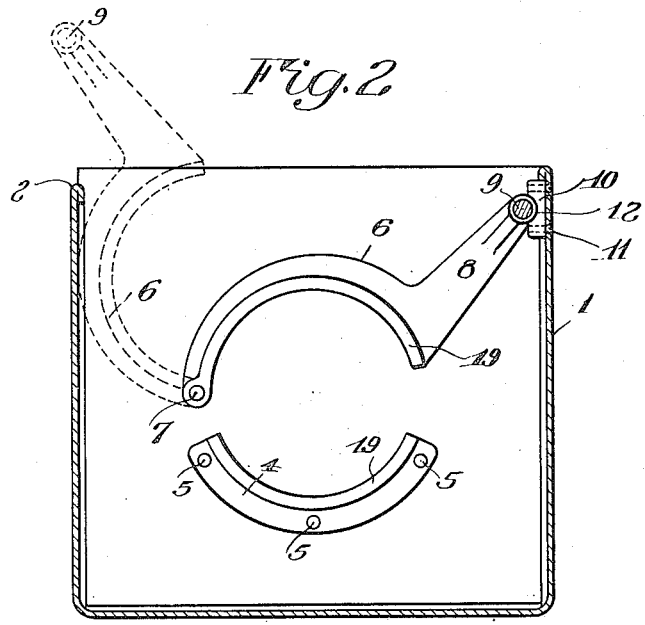
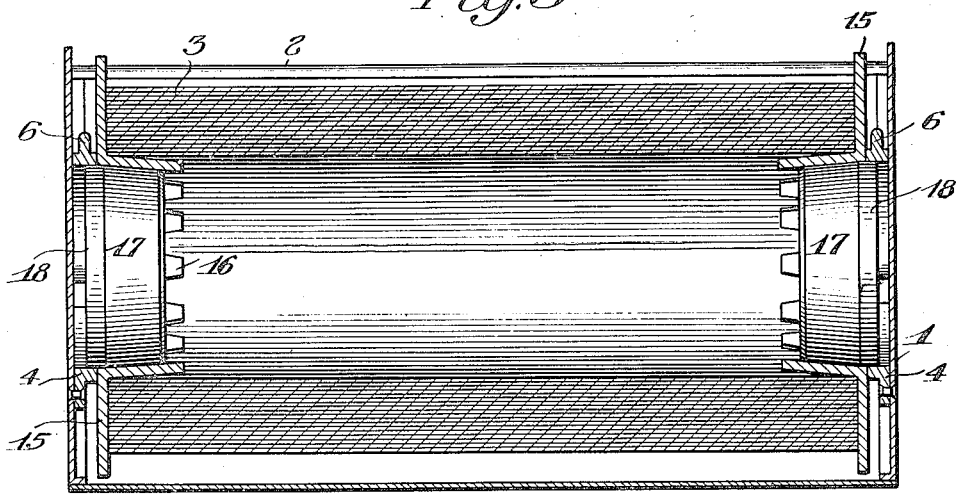
INVENTOR.
John S. Greene
BY
his ATTORNEY Patented Oct. 23, 1923.

1,471,728

UNITED STATES PATENT OFFICE.

JOHN S. GREENE, OF ROCHESTER, NEW YORK, ASSIGNOR TO PHOTOSTAT CORPORATION, OF PROVIDENCE, RHODE ISLAND, A CORPORATION OF RHODE ISLAND.

FILM-ROLL BOX.

Substitute for application Serial No. 347,344, filed December 26, 1919. This application filed June 29, 1921. Serial No. 481,204.

*To all whom it may concern:*

Be it known that I, JOHN S. GREENE, of Rochester, in the county of Monroe and State of New York, have invented certain new and useful Improvements in Film-Roll Boxes; and I do hereby declare the following to be a full, clear, and exact description of the same, reference being had to the accompanying drawings, forming a part of this specification, and to the reference numerals marked thereon.

My present invention relates to photography and more particularly to the cameras of the larger and heavier type known as commercial cameras wherein it is customary to make positive prints directly upon sheets of sensitized paper provided in large and heavy rolls, and the invention has for its object to provide a film cartridge or roll box of this kind for use in such cameras which will be simple in construction, convenient to handle and will feed the paper uniformly and evenly. The improvements are directed in part toward the bearings for the roll and toward means providing greater convenience in manipulating the roll with reference to such bearings. To these and other ends the invention resides in certain improvements and combinations of parts all as will be hereinafter more fully described, the novel features being pointed out in the claims at the end of the specification.

In the drawings:

Figure 1 is a top view of a film box and roll constructed in accordance with and illustrating one embodiment of my invention, the cover being removed;

Figure 2 is a central transverse section through the box with the roll removed;

Figure 3 is a longitudinal central section with the roll in place;

Figure 4 is an enlarged fragmentary view partly broken away of the locking devices for the roll bearings, and Figure 5 is an enlarged sectional detail taken substantially on the line 5—5 of Figure 4.

Similar reference numerals throughout the several views indicate the same parts.

The cover of the box 1 is not shown in any of the views and need not always be provided it being understood that the box fits within a roll chamber provided in the camera and the sensitized paper or film as I shall call it is drawn over a lateral edge 2 of the box and into the focal plane of the camera. The box is preferably of sheet metal and I make arrangements for the roll 3 to turn in large bearings therein so that it will have less of a tendency to ride and the frictional resistance will act to prevent the film from overrunning. The bearings are provided on each end wall to project inwardly therefrom and each bearing is split consisting of a lower fixed portion 4 riveted at 5 and an upper movable portion 6 pivoted to the box at 7. Extending substantially radially from one end of the pivoted portion of the bearing is an arm 8 forming a handle and these arms are connected together for joint movement by a rod or bar 9 extending substantially the length of the box. By means of the handles 8 the pivoted bearing portions may be readily swung from the operative position shown in full lines in Figure 2, to the inoperative position shown in dotted lines in which latter position the lower fixed bearing portion is completely uncovered to readily receive the roll hereinafter described. The handles are readily accessible as is their common manipulating bar 9 because during the majority of their movements they swing exteriorly of the box and in the operative position of the bearing portion, they are in proximity to the open top of the box.

To secure the bearings in operative position to retain the roll, blocks 10 are secured as by the screws 11 to one side of the box and these blocks are provided with semi-cylindrical recesses 12 of greater radius than the rod 9 but of the same radius as a sleeve 13 slidable longitudinally on the rod in the region of each block. The sleeves are manipulated by means of knurled extensions 14 and when seated in the recesses of the blocks, they prevent the movable portions 6 of the bearings from swinging on their pivots 7. Nevertheless, the locking sleeves may be quickly released and the bearing portions swung upwardly with practically one movement.

In preparing the roll 3 I wind it on a suitable mandrel which mandrel is then removed, leaving the roll hollow. I then apply end flanges 15 to the roll performing the functions of the ordinary end flanges of a spool, but these flanges which may be made of heavy cardboard or metal are provided with central openings bordered by inwardly projecting ears 16 which are inserted in each instance in the hollow end of the roll. I then drive into the opening in each flange a tapered journal block 17 which wedges the ears 16 against the interior of the roll and completes the formation of a sort of spool of which the roll itself is the center or core. A portion 18 of each block, which portion is preferably not tapered but cylindrical, projects from the face of the flange 15 and is adapted to turn in the bearing 4—6. This constitutes a cheap way of making and mounting a spool-like roll which, in combination with my improved construction of box, is safe to use, inasmuch as the bearings and the end walls of the box prevent any tendency of the blocks 17 to loosen or become disengaged when the body of the roll has been depleted. The central portions of the flanges 15 preferably have an end thrust against the bearing members which latter are flanged or embossed at 19 to provide this slight contact, but otherwise the end flanges are free and are not apt to give trouble because of warping or swelling on account of changed atmospheric conditions.

I claim as my invention:

1. The combination with a box having projecting bearings secured to the end walls thereof, of a film roll in the box, end flanges for the roll having ears extending into the center of the latter and tapered journal blocks wedged into the center of the roll at each end to secure the flange ears and having projecting portions extending beyond the flanges and turning in the bearings, said blocks being prevented from being disengaged from the roll by the said end walls of the box.

2. The combination with a film roll box having end walls, of split bearings for a film roll mounted wholly on the inner side of each end wall, each bearing comprising a fixed portion and a pivoted portion provided with a handle adapted to swing exteriorly of the box.

3. The combination with a film roll box, of split bearings for a film roll at each end thereof, each bearing comprising a fixed portion and a pivoted portion provided with a handle and means movable into and out of the box connecting the handles for joint movement.

4. The combination with a film roll box, of split bearings for a film roll at each end thereof, each bearing comprising a fixed portion and a pivoted portion provided with a handle, a rod connecting the handles for joint movement and a latch cooperating with the rod.

5. The combination with a film roll box, of split bearings for a film roll at each end thereof, each bearing comprising a fixed portion and a pivoted portion provided with a handle, a rod connecting the handles for joint movement and a sleeve slidable on the rod and interlocking with the box.

6. The combination with a film roll box having a retaining block secured thereto provided with a semi-cylindrical recess, of split bearings for a film roll at each end thereof, each bearing comprising a fixed portion and a pivoted portion provided with a handle, a rod connecting the handles for joint movement and a sleeve slidable on the rod and interlocking with the block to hold the pivoted bearing portion in operative position.

JOHN S. GREENE.